M. HELM.
BEARING FOR MEASURING INSTRUMENTS.
APPLICATION FILED MAY 24, 1912.
1,104,189.
Patented July 21, 1914.
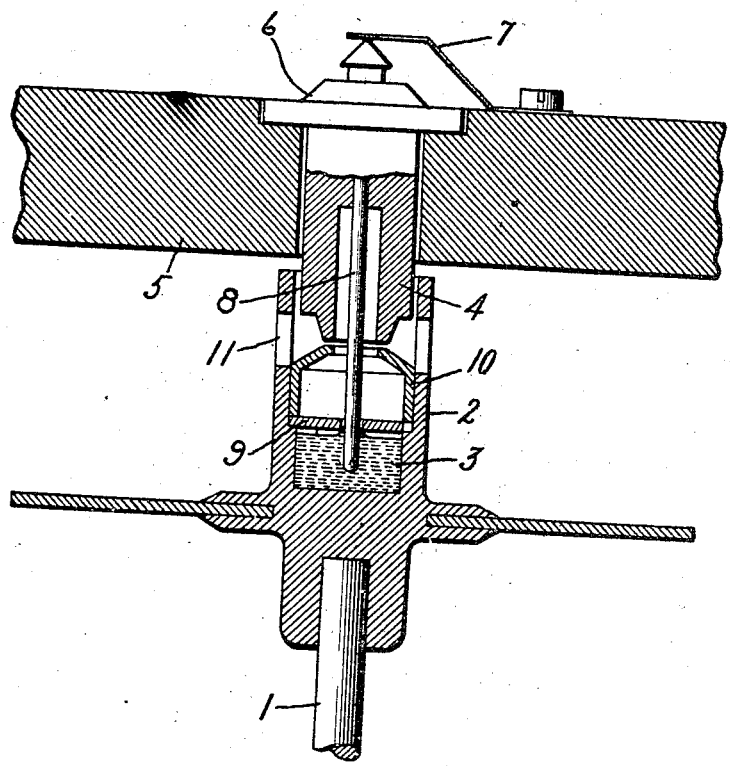
WITNESSES
J. Earl Ryan
J. Ellis Glen
INVENTOR
MAX HELM
BY Albert G. Davis
HIS ATTORNEY

UNITED STATES PATENT OFFICE.

MAX HELM, OF PANKOW, GERMANY, ASSIGNOR TO GENERAL ELECTRIC COMPANY, A CORPORATION OF NEW YORK.

BEARING FOR MEASURING INSTRUMENTS.

1,104,189.  Specification of Letters Patent.  Patented July 21, 1914.

Application filed May 24, 1912. Serial No. 699,492.

*To all whom it may concern:*

Be it known that I, MAX HELM, a subject of the Emperor of Germany, residing at Pankow, Germany, have invented certain new and useful Improvements in Bearings for Measuring Instruments, of which the following is a specification.

My invention relates to bearings for measuring instruments and particularly to upper bearings for electric meters.

The objects of my invention are to provide an upper bearing for such instruments which will be self-lubricating, and which will be elastic or flexible, but in which the elasticity is restricted within the elastic limit. Upper bearings for measuring instruments have heretofore been constructed so as to give a certain amount of flexibility to the upper end of the rotating shaft. My present invention is an improvement in the construction of such bearings, and aims to limit the flexibility of the delicate elements constituting the bearing within such reasonable bounds that the limit of elasticity can never be exceeded, and thus the chances of injuring the bearing by hard blows, such as are likely to be received during transportation of the apparatus, are reduced to a minimum.

By my invention the rotating element of the meter is provided at its upper end with an oil chamber, and a guide pin extends into the chamber to limit transverse movement of the chamber. The usual pintle secured to either the pin or the chamber tends normally to hold the chamber out of engagement with the pin.

For a full understanding of my invention, reference is to be had to the accompanying drawing, in which the figure is a sectional elevation showing one embodiment of the novel features of the invention.

In the drawing, the rotatable shaft 1 of a meter, for example, an electric meter, is provided at its top with an oil chamber 2 containing a quantity of oil 3. The shaft and oil chamber are represented in the drawing as comprising two separate parts, but if desired, they may be made integral. A guide pin 4 is arranged in an opening in the upper stationary support 5 of the frame of the meter. The pin 4 is attached to a top 6 which rests upon the support 5 and is flexibly held in position by means of the spring 7.

In the construction illustrated in the drawing, I have shown the flexible pintle 8 forming the bearing pivot for the revolving shaft, secured to the pin 4, although it is evident that the pintle may be secured in other ways. The pintle 8 passes through a bearing plate 9, preferably made of metal and secured in the oil chamber 2. A dust tight shell 10 incloses the lower part of the oil chamber and excludes dust from the bearing between the pintle 8 and the plate 9. The wall of the oil chamber is extended upwardly so as to embrace the guide pin 4. A slight clearance is allowed between the upper wall of the chamber and the pin, but this clearance is such that the strain on the meter shaft and consequently on the pintle 8 is not permitted to exceed the limit of elasticity of the pintle. The pintle serves to maintain the shaft and oil chamber in alinement and to normally hold the chamber out of engagement with the guide pin. Openings 11 are provided in the extension of the oil chamber for observing the alinement of the different elements of the bearing.

The operation of my device is as follows:—A rotation of the shaft 1 and oil chamber 2 causes the oil in the latter to rise on the pintle 8 and lubricate the bearing between the pintle and the plate 9. The guide pin 4, by limiting transverse movement of the extension of the oil chamber, prevents undue strain on the flexible pintle due to strains or distortions in the alinement of the meter shaft. It will thus be seen that I provide a flexible upper bearing for the meter shaft which is protected from injurious strains and is self-lubricating.

While I have described the preferred embodiment of my invention, I do not limit myself to the same, but aim in the appended claims to cover all embodiments which will be obvious to those skilled in the art and which are within the scope of my invention.

What I claim as new and desire to secure by Letters Patent of the United States, is,—

1. A meter bearing comprising a rotatable oil chamber having an extended upper wall, a guide pin extending into the upper part of the chamber and surrounded by the upper wall thereof and adapted to limit transverse movement of the chamber, means operatively supporting said guide pin and permitting a movement thereof, and a pintle secured to said pin and normally holding the chamber and the pin out of engagement.

2. A meter bearing comprising a rotatable shaft, an oil chamber at the upper end of said shaft, a stationary support having an opening, a top member resting on said support, a guide pin secured to said top member and extending through said opening and into the upper part of said chamber and limiting transverse movement of the latter, a pintle normally holding the chamber out of engagement with the pin, and means for flexibly holding the top upon said support.

3. A meter bearing comprising a rotatable shaft, an oil chamber at the upper end of said shaft, a stationary support having an opening, a top member resting on said support, a guide pin secured to said top member and extending through said opening and into the upper part of said chamber and limiting transverse movement of the latter, a pintle secured to said pin and normally holding the chamber out of engagement with the pin, and means for flexibly holding the top upon said support.

In witness whereof, I have hereunto set my hand this first day of May, 1912.

MAX HELM.

Witnesses:
FORSYTH FIVELL,
HENRY HASPER.